United States Patent
Tezuka (10) Patent No.: US 7,471,997 B2
(45) Date of Patent: Dec. 30, 2008

(54) LANDING-CONTROL DEVICE AND LANDING-CONTROL METHOD FOR AIRCRAFT

(75) Inventor: Syunsuke Tezuka, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 766 days.

(21) Appl. No.: 10/913,404

(22) Filed: Aug. 9, 2004

(65) Prior Publication Data
US 2005/0033489 A1 Feb. 10, 2005

(30) Foreign Application Priority Data
Aug. 8, 2003 (JP) ............................ 2003-289912

(51) Int. Cl.
G06F 19/00 (2006.01)
B64D 45/04 (2006.01)

(52) U.S. Cl. ............................ 701/16; 701/3; 701/120; 701/121; 700/104; 700/49; 342/33; 342/35; 342/357.06; 342/357.12; 342/357.14

(58) Field of Classification Search .................. 701/16, 701/18, 120, 3, 121; 340/945; 342/63, 33, 342/35, 357.05, 357.12, 357.14; 700/104, 700/49
See application file for complete search history.

(56) References Cited

U.S. PATENT DOCUMENTS

| 5,951,607 | A  | * | 9/1999 | Senn et al. .................... 701/1 |
| 6,067,484 | A  | * | 5/2000 | Rowson et al. ................ 701/16 |
| 6,086,617 | A  | * | 7/2000 | Waldon et al. ................. 703/2 |
| 6,154,693 | A  | * | 11/2000 | Aberschitz et al. ............ 701/16 |
| 6,157,876 | A  | * | 12/2000 | Tarleton et al. ............... 701/16 |
| 6,178,363 | B1 | * | 1/2001 | McIntyre et al. .............. 701/16 |
| 6,185,470 | B1 | * | 2/2001 | Pado et al. ................... 700/104 |
| 6,260,797 | B1 | * | 7/2001 | Palmer ......................... 244/49 |
| 7,109,914 | B2 | * | 9/2006 | Falcati ......................... 342/33 |
| 7,222,002 | B2 | * | 5/2007 | Maine .......................... 701/3 |
| 7,286,077 | B2 | * | 10/2007 | Falcati et al. .................. 342/33 |
| 2005/0033489 | A1 | * | 2/2005 | Tezuka ........................ 701/16 |

FOREIGN PATENT DOCUMENTS

| JP | 7-36506 | 2/1995 |
| JP | 9-88685 | 3/1997 |
| JP | 2002-312755 | 10/2002 |

* cited by examiner

*Primary Examiner*—Thomas G Black
*Assistant Examiner*—Wae Louie
(74) *Attorney, Agent, or Firm*—McGinn IP Law Group, PLLC (57) ABSTRACT

A landing-control device is provided having a new structure for carrying out landing control of an aircraft. A detecting unit 10 detects at least a relative altitude from a landing surface to an aircraft. A parameter-generating unit 20 is constructed by a neural network having a feedback loop which receives a detection value detected by the detecting unit 10 and outputs a landing-control parameter of the aircraft, an output of a first node among plural nodes constituting the neural network being input to a second node different from the first node. A controlling unit 30 controls the aircraft based on the control parameter output from the parameter-generating unit 20.

14 Claims, 4 Drawing Sheets

LANDING-CONTROL DEVICE AND LANDING-CONTROL METHOD FOR AIRCRAFT

BACKGROUND OF THE INVENTION

1. Field of the Invention

The present invention relates to a landing-control device and method for an aircraft, and particularly to control of a vertical speed of landing on a place where a landing surface such as a ship deck that swings with time.

2. Description of the Related Art

There have been hitherto proposed various control technologies that use a neural network as one of technologies controlling a control target with high precision irrespective of a non-linear element of the control target, external disturbance or a change of an environment over time. According to the neural network, a coupling weight coefficient is properly set in a learning process carried out in advance, so that a required control parameter can be output-based on predetermined input information with high precision. A back propagation method is generally used in the learning process of the neural network. Control using the neural network includes air-fuel ratio control of an internal-combustion engine disclosed in the JP-A-9-88685, or control of a robot, a machine tool, an XY stage, a disc device or the like disclosed in the JP-A-7-36506.

Vertical takeoff and landing aircrafts such as helicopters, etc. are utilized on many occasions because they do not need a long runway at the takeoff and landing and do not limit a landing place, and thus automation of the control thereof has been desired.

However, with respect to this type of aircrafts, the merit that no limitation is imposed on any landing place rather makes it difficult to perform automation of control. For example, in the case of landing on a landing surface such as a ship deck, the landing surface swings due to a wave surface, and thus the speed control of the aircraft in the vertical direction is more difficult than in the case of landing on a static landing surface. This is because if the speed control fails, an impact of the landing is intensified (a hard landing state), resulting in damage of the body of the aircraft. Furthermore, since the wave surface is irregular, it is difficult for a conventional control technology to estimate the wave surface for the control, and thus there is no other way to rely on than a manual operation of an experienced operator.

SUMMARY OF THE INVENTION

The present invention has been implemented in view of the foregoing situation, and has an object to provide a landing-control device for an aircraft having a novel construction.

Another object of the present invention is to enable proper speed control of landing on a swinging landing surface.

In order to solve such problems, a first invention provides a landing-control device for an aircraft, comprising a detecting unit detecting at least a relative altitude from a landing surface to the aircraft, a parameter-generating unit constructed by a neural network that takes a detection value detected by the detecting unit as its input and outputs a landing-control parameter of the aircraft, the neural network having a feedback loop wherein an output of a first node of the neural network is input to a second node different from the first node, and a controlling unit controlling the aircraft based on the landing-control parameter output from the parameter-generating unit.

In the first invention, it is preferred that a coupling weight coefficient in the neural network is learned by using a genetic algorithm. In this case, it is preferred that a landing condition of the aircraft is estimated by using plural swing models reproducing different swing motions of the landing surface so that an optimum solution fitted to an evaluation condition is set to the coupling weight coefficient. Here, the plural swing models maybe changed to different swing models every evolution of a predetermined generation cycle. Furthermore, it is preferred that the landing condition of the aircraft is estimated by using an artificial swing model wherein a swing condition of the landing surface is intentionally operated by an operator, so that the optimum solution fitted to the evaluation condition is set to the coupling weight coefficient.

Additionally, it is preferred in the first invention that the neural network is constructed by plural layers including an input layer, an intermediate layer and an output layer, and has the feedback loop herein the output of the first node at the output layer is fed back to an input of the second node at the input layer.

A second invention provides a landing-control method for an aircraft, comprising a first step of outputting a landing-control parameter of the aircraft by inputting at least a relative altitude from a landing surface to the aircraft to a neural network having a feedback loop wherein an output of a first node in the neural network is input to a second node different from the first node, and a second step of controlling the aircraft based on the landing-control parameter output from the neural network.

In the first and second inventions, it is preferred that the output of the first node is temporally delayed and then input to the second node in the feedback loop.

Additionally, it is preferred that the second invention further comprises a third step of learning a coupling weight coefficient in the neural network by using a genetic algorithm. In this case, it is preferred that the third step estimates a landing condition of the aircraft by using plural swing models that reproduces different swing motions of the landing surface, so as to set an optimum solution fitted to an evaluation condition as the coupling weight coefficient. Here, the third step may include a step of changing the plural swing models to different swing models every evolution of a predetermined generation cycle Furthermore, it is preferred that the third step includes a step of estimating the landing condition of the aircraft by further using an artificial swing model wherein a swing condition of the landing surface is intentionally operated by an operator, so as to set the optimum solution fitted to the evaluation condition as the coupling weight coefficient.

DESCRIPTION OF PREFERRED EMBODIMENT

Figure 1:
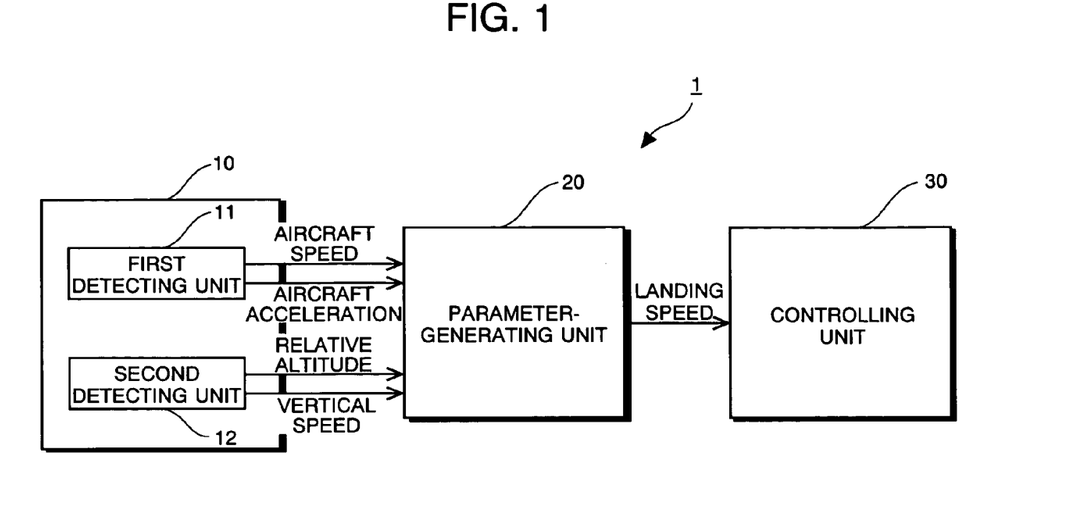
FIG. 1 is a block diagram showing a landing-control device according to a present embodiment.

FIG. 1 is a block diagram showing the construction of a landing-control device for an aircraft according to a present embodiment. The landing-control device 1 is installed in a vertical takeoff and landing aircraft (hereinafter referred to as an "aircraft") such as a helicopter or the like, and carries out the speed control of the aircraft in the vertical direction during landing. The landing-control device 1 comprises a detecting unit 10, a parameter-generating unit 20 and a controlling unit 30.

The detecting unit 10 comprises a first detecting unit 11 for detecting a condition of an aircraft and a second detecting unit 12 for detecting the relative relationship between the aircraft and a landing surface. For example, an accelerometer is used as the first detecting unit 11, and an acceleration of the aircraft in the horizontal direction (hereinafter referred to as an "aircraft acceleration") is detected by the first detecting unit 11. Furthermore, the first detecting unit 11 calculates the speed of the aircraft in the horizontal direction (herein after referred to as an "aircraft speed") by integrating the aircraft acceleration thus detected. On the other hand, a stereo-image-processing device containing a stereo camera and an image-processing system is used as the second detecting unit 12 for instance, and the distance between the aircraft and the landing surface (that is, the relative altitude there between) is detected by the second detecting unit 12. This stereo camera is attached at the lower part of the body of the aircraft, and captures an image of a scene beneath the aircraft to output a pair of images. The pair of images thus output from the stereo camera is subjected to well-known stereo image processing by the image-processing system equipped at a subsequent stage to generate distance data. The distance data comprises a group of displacement amounts of small image areas (that are, parallax components) having a correlation in brightness between one image and the other image, and represents a two-dimensional distribution of the distance below the aircraft. Subsequently, the distance to the landing surface (the relative altitude) is calculated based on the distance data. Furthermore, the speed of the aircraft in the vertical direction (herein after referred to as a "vertical speed") is calculated based on the variation of the calculated relative altitude per unit time. These values thus detected by the detecting unit 10 are output to the parameter-generating unit 20 at a subsequent stage.

Figure 2:
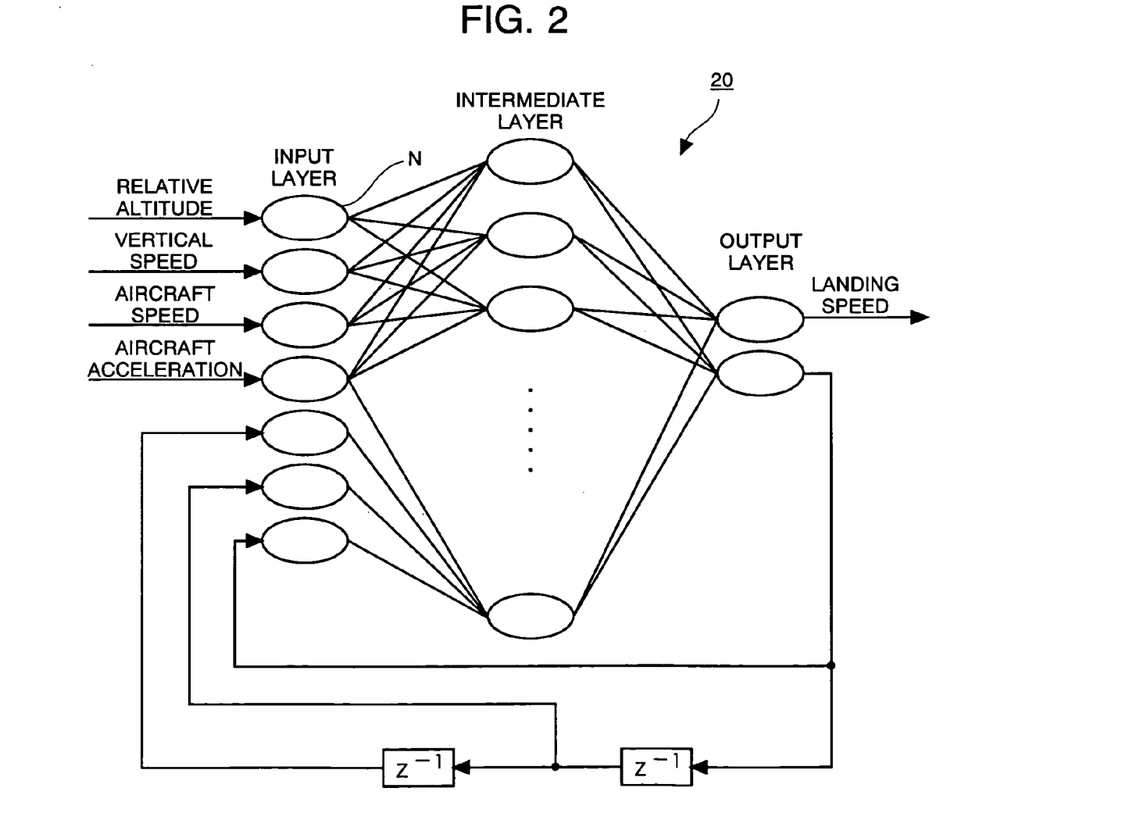
FIG. 2 is a diagram showing details of a parameter-generating unit.

FIG. 2 is a diagram showing the details of the parameter-generating unit 20. The parameter-generating unit 20 comprises a neural network NN. The neural network NN has plural nodes N each having the same function, and is designed in a hierarchical neural network wherein the respective nodes are placed hierarchically (in the present embodiment, it is a hierarchical neural network having plural layers including an input layer, an intermediate layer and an output layer). In this neural network NN, the number of nodes N constituting each layer is properly set by an operator. The operator determines a network structure so that each layer has the optimum number of the nodes by considering the relationship (tradeoff) between the enhancement of reliability of a solution (an output value) acquired by increasing the number of the nodes N and the enhancement of a processing speed acquired by reducing the number of the nodes N, which are mutually incompatible with each other.

In the neural network NN, nodes N used for inputting information is set in the input layer, the information being required for the neural network NN to generate and output a landing-control parameter (in the present embodiment, a landing speed in the vertical direction). In the present embodiment, the nodes N are set in the input layer for inputting the aircraft acceleration, the aircraft speed, the relative altitude and the vertical speed detected by the detecting unit 10. Furthermore, nodes N used for outputting the landing-control parameter of the aircraft are set in the output layer. With respect to nodes N in the intermediate layer, a necessary number of nodes N are prepared based on an operator's experience in consideration of the relationship of tradeoff described above.

Additionally, the neural network NN includes a feedback loop wherein an output of some node N (a node N of the output layer in the present embodiment) is fed back to another node N (a node N of the input layer in the present embodiment). Therefore, nodes N used for the output regarding feedback (in the present embodiment, one node) are further set in the output layer, while nodes N used for an input corresponding to the output concerned (in the present embodiment, three nodes) are further set in the input layer. Through the loop, the output of the node N of the output layer is input to a node N of the input layer after the output concerned is delayed by one cycle in the system process. After the output of the node N is further delayed through a first delay element $Z^{-1}$ by only one cycle (accordingly, after the output is delayed from an initial input corresponding to the output of the node N by only two cycles), the output concerned is input to a node N of the input layer. Additionally, after the output of the first delay element $Z^{-1}$ is further delayed through a second delay element $Z^{-1}$ placed at a subsequent stage by one cycle (accordingly, after the output is delayed from the initial input corresponding to the output of the node N by three cycles), the output concerned is input to a node N of the input layer. In the present embodiment, this feedback loop means a loop existing in the neural network. That is, the feedback from the output layer is completed in the neural network NN.

Each of the nodes N carries out calculations represented by equations 1 and 2 on input data yi, and outputs calculation results as output data Yj. Here, "Kij" represents a coupling weight coefficient between an i-th element and a j-th element, and "θj" represents a threshold value.

$$Xj = \Sigma Kij \cdot yi (i=1 \sim n) \quad \text{[Equation 1]}$$

$$Yj = \frac{1}{1 + \exp(-(Xj - \theta j))} \quad \text{[Equation 2]}$$

As is apparent from these equations 1 and 2, an output from some node N is input to another node N according to a predetermined coupling weight coefficient Kij. Here, the equation 2 is called a sigmoid function, and generally used as a function of nodes in the neural network NN. The sigmoid function continuously varies from 0 to 1, and approaches to a step function as the threshold value θj decreases.

In the case of outputting the landing-control parameter by using the neural network NN, it is required to properly adjust (learn) the coupling weight coefficient Kij and the threshold value θj in advance in order to enhance the precision of the output result. Learning the coupling weight coefficient Kij and the threshold value θj is carried out by using a genetic algorithm.

The controlling unit 30 compares the landing-control parameter (the landing speed in the present embodiment) output from the parameter-generating unit 20 with the present value of the landing-control parameter (that is, the vertical speed). Subsequently, various kinds of actuators are controlled so that the aircraft has a landing speed generated and output by the parameter-generating unit 20. Accordingly, an engine output or the rotational number/pitch of a rotor is controlled so that the vertical speed of the aircraft is adjusted.

Figure 3:
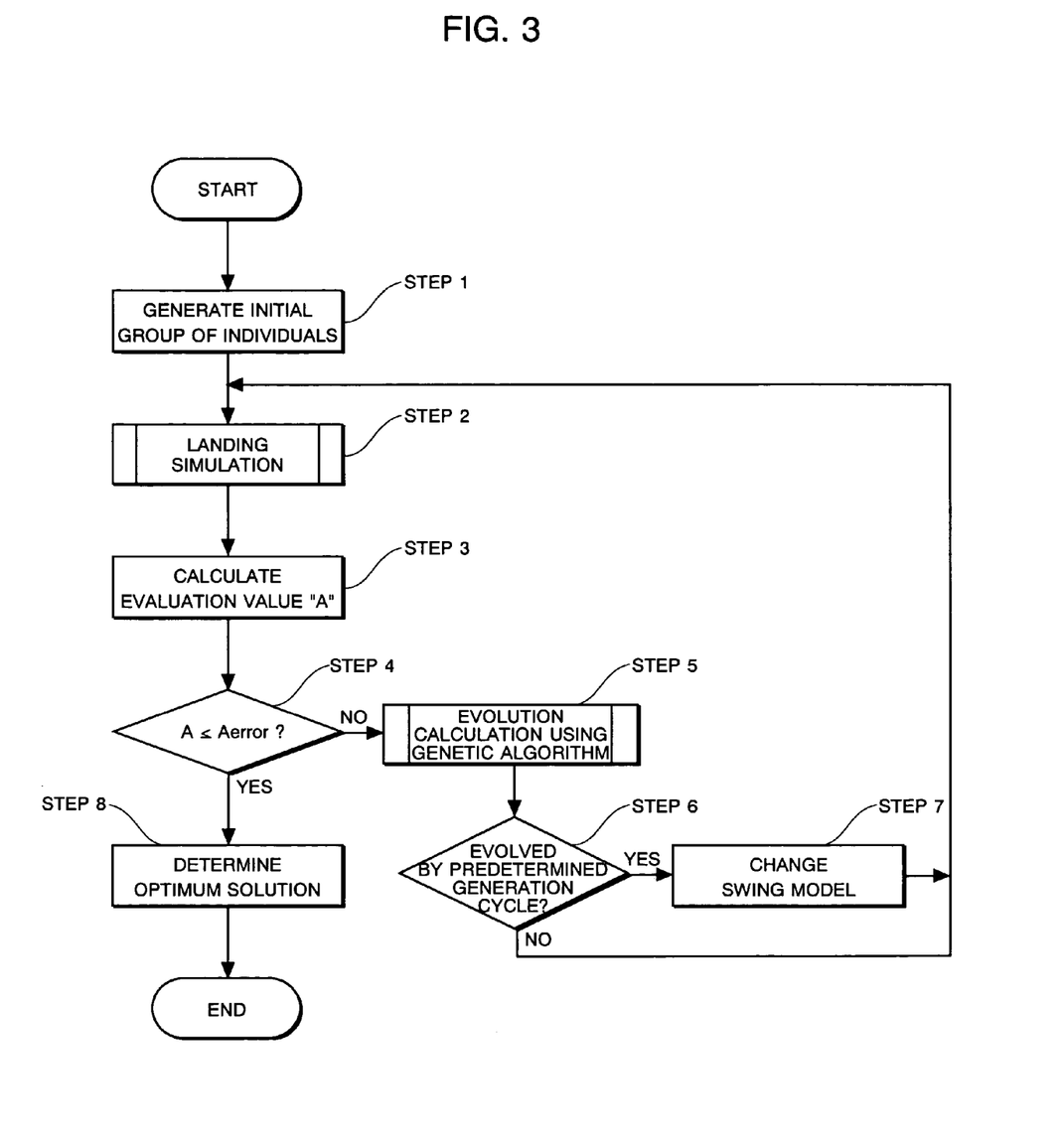
FIG. 3 is a flowchart showing a procedure of determining a coupling weight coefficient and a threshold value by using a genetic algorithm.

FIG. 3 is a flowchart showing a procedure of determining the coupling weight coefficient Kij and the threshold value θj by using the genetic algorithm. In this process, the aircraft is controlled according to the landing-control parameter output from the neural network NN while properly adjusting the values of the coupling weight coefficient Kij and the threshold value θj. If it is judged that the behavior of the aircraft satisfies a predetermined evaluation condition, this learning process ends. The evaluation condition includes conditions such as "the landing is carried out", "the vertical speed of the landing is low", "the time required for the landing is short" and "an energy amount required for the landing is small". The learning proceeds with simulations because an actual aircraft might be damaged if the aircraft is directly controlled (see FIG. 4).

First, in a step 1, there is generated an initial group of individuals each being constructed by genetic types. The genetic types correspond to the coupling weight coefficient Kij and the threshold value θj. One individual has all of the coupling weight coefficients Kij and the threshold values θj as the genetic types. The initial group of the individuals is a group of the "n" individuals, and comprises various values of the genetic types Kij, θj every individual. Initial values are determined for the genetic types Kij, θj constituting each of individuals 1 to n by random numbers, for example. Therefore, if the coupling weight coefficient Kij and the threshold value θj are set for every individual 1 to n in the neural network NN, the "n" neural networks NN are acquired whose coupling weight coefficient Kij and threshold value θj are set.

Figure 4:
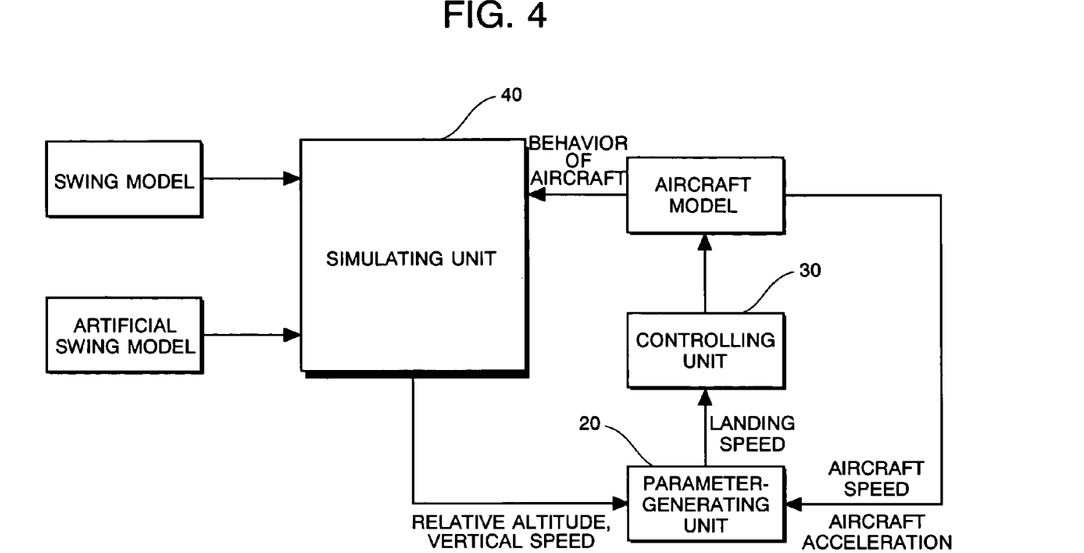
FIG. 4 is a diagram showing a system construction including a simulating unit.
Figure 5:
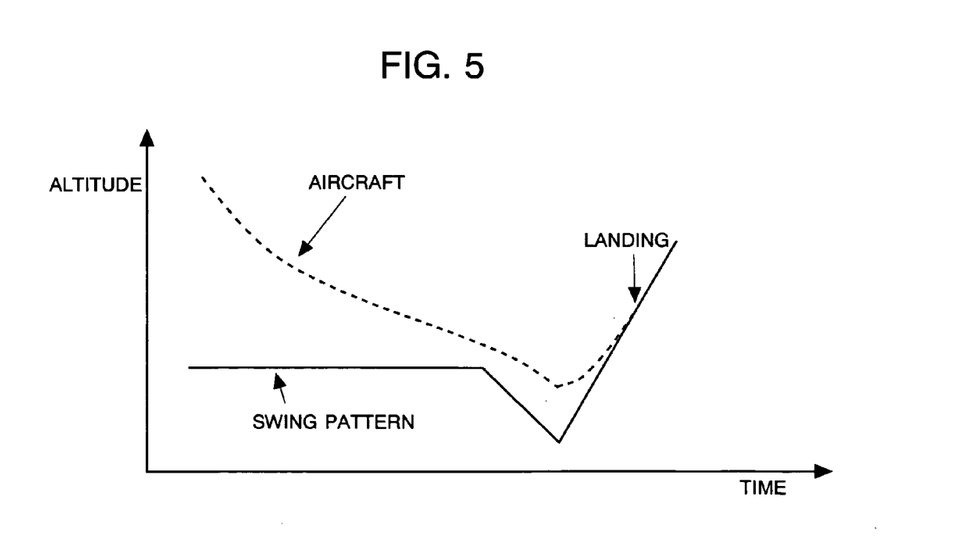
FIG. 5 is a diagram showing an example of an artificial swing model.

A landing simulation is carried out in a step 2. This simulation reproduces a landing condition when an aircraft is controlled, based on the landing-control parameter output from the neural network NN for which the genetic types Kij, θj are set with each of the individuals 1 to N as processing targets. A swing model is prepared in a simulating unit 40. The swing model expresses a swing condition of the landing surface on the ship as a well-known function formula, the swing condition corresponding to a condition of the wave surface. Variations maybe considered as the swing condition of the landing surface, and thus plural (for example, twenty) swing models reproducing different swing motions of the landing surface are used in one-generation learning by each of the individuals 1 to n. In the simulating unit 40 is also prepared an artificial swing model intentionally operated by an operator (specifically, a dynamic swing condition of the landing surface which cannot be reproduced by the swing motion of the landing surface caused by the wave surface). FIG. 5 is a diagram showing an example of the artificial swing model. In FIG. 5, a time-sequential transition of the landing surface (a swing pattern) reproduced by the artificial swing model is indicated by a solid line, and a time-sequential transition of the relative altitude of the aircraft is indicated by a dotted line. In this artificial swing model, the landing surface is kept unmovable until the distance between the aircraft and the landing surface is reduced to some fixed value (for example, 1 meter) or less. If the aircraft approaches the landing surface within a distance less than the fixed value, the landing surface shifts downwardly (in such a direction as to be away from the aircraft) by a predetermined amount. After the landing surface shifts downwardly by some fixed amount, the landing surface shifts upwardly (in such a direction as to approach to the aircraft) until the aircraft lands on the landing surface.

Figure 6:
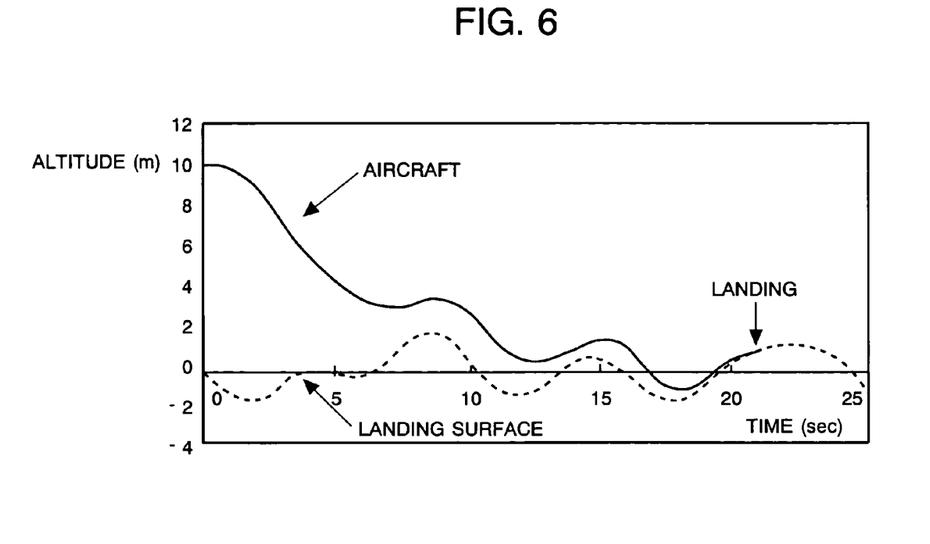
FIG. 6 is a diagram showing an altitude locus of an aircraft in a landing simulation.

The reproduction of the landing condition is carried out based on the behavior of the aircraft which is reproduced by an aircraft model corresponding to the swing model and the artificial swing model. This aircraft model is achieved by modeling the behavior of the aircraft with a function expression in advance, thereby reproducing an actual behavior of the aircraft when the aircraft is controlled based on so me landing-control parameter. In this simulation, the relative altitude and the vertical speed of the aircraft are calculated by the simulating unit 40, and fed back to the neural network NN. Furthermore, the aircraft speed and the aircraft acceleration are calculated from the aircraft model, and also fed back to the neural network NN. Such process is repeated, thereby carrying out the simulation of the landing condition concerning the swing model (or artificial swing model). FIG. 6 is a diagram showing an altitude locus of the aircraft in a landing simulation. In FIG. 6, the time-sequential transition of the relative altitude of the aircraft is indicated by a solid line, while a swing pattern of the landing surface is indicated by a dotted line. Through the simulation, it is specified whether the aircraft landed, and also the aircraft speed of the landing, the time required for the landing and the energy amount required for the landing are specified.

In a step 3, an evaluation value A is calculated for each of the individuals 1 to n based on the simulation result. The evaluation value A is reduced for an individual which more comprehensively satisfies plural evaluation conditions (composite conditions) such as "the landing is carried out", "the aircraft speed of the landing is low", "the time required for the landing is short" and "the energy amount required for the landing is small", that is, which has better evaluation. For example, the evaluation value A is calculated by individually calculating an evaluation value under each of the evaluation conditions, setting a weight coefficient in conformity with the importance degree of each evaluation condition corresponding to each evaluation value thus calculated and then carrying out the sum of products. Each of the individuals 1 to n in the group of the individuals are newly rearranged as individuals 1 to n in the order of increasing the evaluation value A starting from an individual having the smallest evaluation value A.

In a step 4, it is judged whether the evaluation A regarding an individual 1 is less than or equal to a judgment evaluation value A error. The judgment evaluation value A error is preset through experiments or simulations as the maximum value of the evaluation value A with which the landing condition of the aircraft can be regarded as sufficiently satisfying the composite conditions described above. If a negative judgment is made in the step 4, that is, if the evaluation value A is larger than the judgment evaluation value A error, the process shifts to a step 5. On the other hand, if a positive judgment is made in the step 4, that is, if the evaluation value A is less than or equal to the judgment evaluation value A error, the process shifts to a step 8.

In the step 5, an evolution calculation based on a genetic algorithm is carried out. Specifically, selection/cull-out of the individuals 1 to n is carried out in the group of the individuals. Inverted-roulette-type selection, rank-type selection, tournament-type selection or the like is used as a method for the selection/cull-out as described above. Through the process of the step 4, some individuals (or an individual group) are selected, and the individuals thus selected are deleted from the group of the individuals. The number of the individuals constituting the group of the individuals is kept by shifting individuals of the same number as the deleted individuals to the positions of the deleted individuals starting from an individual whose evaluation value A is smaller. Subsequently, a next-generation group of the individuals is generated. Specifically, an optimizing unit 10 subjects the genetic types Kij, θj constituting the individuals of the group to mutation and crossing-over. In the mutation, any genetic type Kij (or θj) in some individual is selected by a random number, and varied to a value caused by the random number. In the crossing-over, in some individual group selected by a random number, values of genetic types Kij (or θj) selected by random numbers are mutually exchanged with each other. The method of selecting individuals to be subjected to the mutation and the crossing-over is not limited to the selection based on random numbers, and with respect to the individual 1 having the smallest evaluation value A, no mutation and no crossover maybe conducted on the individual 1 to maintain the individual concerned.

In a step 6, it is judged whether the present group of the individuals has evolved by a predetermined generation cycle (for example, 100 generations). The reason why this judgment is set resides in that over-learning occurs if the learning is carried out under only a specific condition. The over-learning means such a characteristic that an excellent result is acquired under learned conditions (twenty swing models), however, the same result cannot be acquired due to an effect of external disturbance or the like under an unknown condition. Therefore, it is required to change the condition (the swing model) every proper cycle to suppress occurrence of the over-learning. If a positive judgment is made in the step 6, that is, if evolution is carried out by some generation cycle (for example, n×100 generations (n=1, 2, . . . )), the process shifts to a step 7. On the other hand, if a negative judgment is made in this step, the process skips the step 7 and returns to the step 2.

The swing model is changed in the step 7. This change may be made to all the twenty swing models, or selectively made to some swing models (for example, about ten swing models). Subsequently, the process returns to the process of the step 2 and subsequent steps to repeat the above process until the evaluation value A of the individual is reduced to the judgment evaluation value A error or less.

In the step 8, the genetic types Kij, θj constituting the individual 1, that is, the genetics type Kij, θj fitted to the evaluation condition are determined as the optimum solutions, and then the process drops out of this routine. In this case, based on the genetic types Kij, θj constituting the individual 1, the values of the genetic types Kij, θj are set as the coupling weight coefficient Kij and the threshold value θj in the neural network NN.

Figure 7:
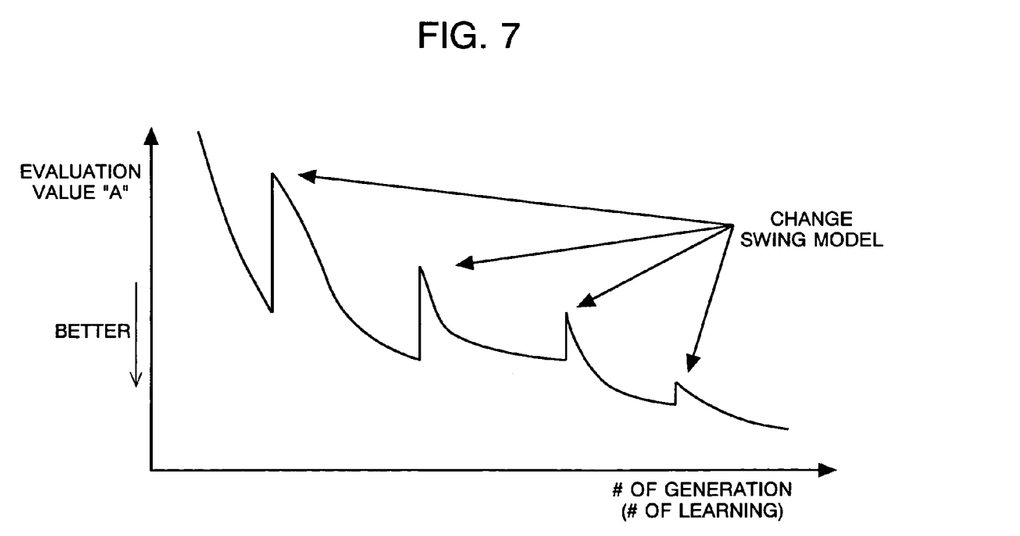
FIG. 7 is a diagram showing a transition of an evaluation value in connection with generation evolution.

FIG. 7 is a diagram showing a transition of the evaluation value A in connection with the generation evolution. As is apparent from FIG. 7, the evaluation value A is reduced as the generation is advanced. This means that the learning progresses in connection with the generation advancement, and the coupling weight coefficient Kij and the threshold value θj of the neural network NN is properly adjusted. When the generation advancement reaches a constant generation cycle, the swing model is changed. Therefore, an unknown condition is newly added, and the evaluation value A is temporarily increased. However, as the generation is further advanced and the learning progresses, the evaluation value A is gradually reduced. If the swing model is periodically changed, the evaluation value is temporarily deteriorated. However, the capacity to various kinds of swing models can be enhanced by repeating the change, so that an increase amount (an increasing degree) of the evaluation value A when the swing model is changed is gradually reduced. Finally, the learning is carried out until the evaluation value A is less than or equal to the judgment evaluation value A error, and thus optimum genetic types Kij, θj can be acquired.

As described above, according to the present embodiment, the coupling weight coefficient Kij (further, the threshold value θj) of the neural network NN having the feedback loop is learned by using the genetic algorithm to determine the optimum solution thereof. A neural network NN having a feedback loop has a problem that it cannot perform a learning rule based on the principle of a steepest descant method such as back propagation. However, according to the present embodiment, such problem can be solved by using the genetic algorithm.

The output of a node N of the output layer is fed back to a node N of the input layer by using the neutral network NN having the feedback loop. In a neural network NN having no feedback loop, the output (the landing-control parameter) of the output layer is dependent on an input thereof at some time point, and a past input record has no effect on the output. Accordingly, even if time-sequential data is input, the output is not made in consideration of the characteristic of a past time-sequential data transition. In the present embodiment, the characteristic of a time-sequential transition (a swing pattern) concerning the swing motion of the landing surface is stored by the feedback loop of the neural network because of the structure of the feedback loop itself. Accordingly, a past time-sequential swing motion of the landing surface is taken into consideration, and a landing-control parameter estimating the condition of the landing surface is output by the neural network NN. Therefore, the speed control can be stably performed by using the landing-control parameter concerned.

The structure of the neural network NN described above is an example, and nodes N used for the purpose of the feedback output may be further placed on the output layer in addition to the above structure. Furthermore, the output layer may be comprised of only a single node used for the purpose of the output of the landing-control parameter and the feedback output. Variations may be made to the feedback loop insofar as it brings a time delay, for example, in addition to the placement of the feedback loop from the output layer to the input layer, a feedback loop may be placed from the intermediate layer to the input layer or from the output layer to the intermediate layer.

Furthermore, in the present embodiment, in the case that the learning of the coupling weight coefficient Kij and the threshold value θj is carried out, the swing model is changed by a predetermined generation cycle. According to this method, even if the number of swing models as evaluation targets is initially small, the evaluation can be performed with many swing models by repeating the change of the swing pattern periodically. Accordingly, over-learning can be suppressed by diversification of the swing models. From the viewpoint of suppressing the over-leaning, the evaluation may be carried out by using many swing patterns. According to this method, however, a solution space is expanded, and thus it is difficult to calculate the optimum solution. Therefore, there is a problem that convergence to the judgment evaluation value A error needs much time. In this sense, according to the present embodiment, the evaluation is carried out with a relatively small number of the swing patterns, and the learning is progressed while excellent individuals are selected, so that the time required to converge the evaluation value A to the judgment evaluation value A error can be suppressed.

When individuals are estimated, the capacity to unexpected variations occurring under actual environments can be learned in advance by using the artificial swing model set under severer conditions than the swing models. Furthermore, since the swing model is periodically changed, the artificial model is estimated for individuals of every generation, so that the evaluation result can be commonly handled as an evaluation index under a constant condition.

When the learning based on the genetic algorithm is carried out, provision of plural evaluation conditions frequently makes it difficult to escape from a local solution. Therefore, with respect to plural composite conditions, such a phenomenon that a calculation time necessary for searching a solution is extremely delayed or the calculation never progresses (so-called a trap to the local solution) occurs. Therefore, in order to solve such a problem, a so-called optimization technique using a systematic evolving method may be used. According to the systematic evolving method, an optimum solution fitted to an evaluation condition containing a combination of plural conditions is calculated by using the genetic algorithm. Specifically, plural stages of GA engines are placed from a low level to a high level, each of the GA engines outputting candidate solutions fitted to an individually set evaluation condition as a evolved individual group PGn (n=1 to N) based on the genetic algorithm. A part of the evolved individual groups PGn, PGn−1 is shifted between an evolved individual group PGn at the low level and an evolved individual group PGn+1 at the high level. Convergence judgment of optimization is carried out based on an evolved individual group PGN of the GA engine at the highest level. An evaluation condition set at each stage is stepwise added with a condition as the stage is shifted from the low level to the high level. Accordingly, evolution calculation corresponding to the optimization degree of the individuals is automatically and autonomously carried out. Furthermore, searching the solution of the evolved individual group is efficiently carried out, and deviation of the individual gene is avoided. As a result, the probability of the trap to the local solution is reduced, and the advance degree of the evolution is made more continuous. Therefore, an excellent solution can be more speedily calculated. The details of the optimization method using the systematic evolving method are disclosed in JP-A-2002-312755, and may be referred to if necessary.

The condition to be detected by the detecting unit 10 is not limited to the above-described mode. For example, the first detecting unit 11 may detect an attitude-angle speed of an aircraft by using a gyro, and integrate the attitude-angle speed thus detected to calculate an attitude angle of the aircraft. Accordingly, information input to the parameter-generating unit 20 can be made abundant, and thus the control can be more precisely performed. The second detecting unit 12 may calculate the relative altitude by using arranging sensor such as a laser radar or millimetric-wave radar. If the relationship between the aircraft and the landing surface is detected, information may be acquired from the landing surface side to detect the relative relationship therebetween. In this case, the information must be shared between the landing surface and the aircraft, and thus there occurs a trouble that a cost required to equip facilities is increased and the landing surface is restricted.

Furthermore, the output of the neural network NN is not limited to the landing speed, and may be the optimum relative altitude or the like. Furthermore, control values for controlling an aircraft such as the output value of an engine, the rotational number/pitch of a rotor, etc. may be directly output. The landing-control device according to the present embodiment may be applied to not only landing on the deck of a ship, but also various modes such as landing on a vehicle traveling on an undulating road, landing on an object floating on the sea. Furthermore, it is needless to say that the landing-control device may be applied to the control in a direction vertical to a static landing surface.

According to the present invention, a new landing-control device can be provided by using a neural network. Furthermore, an output of some node is fed back to another node by using a neural network having a feedback loop. Accordingly, the neural network can store the characteristic of a time-sequential transition related to a swing motion of a landing surface. Therefore, stable landing control is achieved by taking a past time-sequential swing motion of the landing surface into consideration and estimating the condition of the landing surface.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the claims Additionally, the disclosure of Japanese Patent Application No. 2003-289912 filed on Aug. 8, 2003 including the specification, drawing and abstract is incorporated herein by reference in its entirety.

What is claimed is:

1. A landing-control device for an aircraft, comprising:
    a detecting unit detecting at least a relative altitude from a landing surface to the aircraft;
    a parameter-generating unit, comprising:
        a neural network that takes a detection value detected by the detecting unit as its input and, based on the detection value, outputs a landing-control parameter of the aircraft, the neural network having a feedback loop wherein an output of a first node of the neural network is input to a second node different from the first node; and
    a controlling unit controlling the aircraft based on the landing-control parameter output from the parameter-generating unit,
    wherein the output of the first node is temporally delayed and then input to the second node in the feedback loop,
    wherein a coupling weight coefficient in the neural network is learned by using a genetic algorithm, and
    wherein a landing condition of the aircraft is estimated by using plural swing models reproducing different swing motions of the landing surface such that an optimum solution fitted to an evaluation condition is set to the coupling weight coefficient.

2. The landing-control device for the aircraft according to claim 1, wherein the plural swing models are changed to different swing models every evolution of a predetermined generation cycle.

3. The landing-control device for the aircraft according to claim 1, wherein the landing condition of the aircraft is estimated by using an artificial swing model wherein a swing condition of the landing surface is intentionally operated by an operator, such that the optimum solution fitted to the evaluation condition is set to the coupling weight coefficient.

4. The landing-control device for the aircraft according to claim 1, wherein the neural network comprises plural layers, including an input layer having the second node, an intermediate layer, and an output layer having the first node, and has the feedback loop such that the output of the first node at the output layer is fed back to an input of the second node at the input layer.

5. A landing-control device for an aircraft, comprising:
a detecting unit detecting at least a relative altitude from a landing surface to the aircraft;
a parameter-generating unit, comprising:
a neural network that takes a detection value detected by the detecting unit as its input and, based on the detection value, outputs a landing-control parameter of the aircraft, the neural network having a feedback loop wherein an output of a first node of the neural network is input to a second node different from the first node; and
a controlling unit controlling the aircraft based on the landing-control parameter output from the parameter-generating unit.
wherein a coupling weight coefficient in the neural network is learned by using a genetic algorithm, and
wherein a landing condition of the aircraft is estimated by using plural swing models reproducing different swing motions of the landing surface such that an optimum solution fitted to an evaluation condition is set to the coupling weight coefficient.

6. The landing-control device for the aircraft according to claim 5, wherein the plural swing models are changed to different swing models every evolution of a predetermined generation cycle.

7. The landing-control device for the aircraft according to claim 5, wherein the landing condition of the aircraft is estimated by using an artificial swing model wherein a swing condition of the landing surface is intentionally operated by an operator, such that the optimum solution fitted to the evaluation condition is set to the coupling weight coefficient.

8. The landing-control device for the aircraft according to claim 5, wherein the neural network comprises plural layers, including an input layer having the second node, an intermediate layer, and an output layer having the first node, and has the feedback loop such that the output of the first node at the output layer is fed back to an input of the second node at the input layer.

9. A landing-control method for an aircraft, comprising:
using a neural network to output a landing-control parameter of the aircraft by inputting at least a relative altitude from a landing surface to the aircraft to the neural network, the neural network comprising a feedback loop such that an output of a first node in the neural network is inputted to a second node different from the first node;
controlling the aircraft based on the landing-control parameter output; and
learning a coupling weight coefficient in the neural network by using a genetic algorithm,
wherein the output of the first node is temporally delayed and then input to the second node in the feedback loop, and
wherein said learning said coupling weight coefficient comprises:
estimating a landing condition of the aircraft by using plural swing models that reproduce different swing motions of the landing surface, such that an optimum solution fitted to an evaluation condition is set as the coupling weight coefficient.

10. The landing-control method for the aircraft according to claim 9, wherein said learning said coupling weight coefficient comprises:
changing the plural swing models to different swing models every evolution of a predetermined generation cycle.

11. The landing-control method for the aircraft according to claim 9, wherein said learning said coupling weight coefficient comprises:
estimating the landing condition of the aircraft by further using an artificial swing model wherein a swing condition of the landing surface is intentionally operated by an operator to set the optimum solution fitted to the evaluation condition as the coupling weight coefficient.

12. A landing-control method for an aircraft, comprising:
using a neural network to output a landing-control parameter of the aircraft by inputting at least a relative altitude from a landing surface to the aircraft to the neural network, the neural network comprising a feedback loop such that an output of a first node in the neural network is inputted to a second node different from the first node;
controlling the aircraft based on the landing-control parameter output; and
learning a coupling weight coefficient in the neural network by using a genetic algorithm,
wherein said learning said coupling weight coefficient comprises:
estimating a landing condition of the aircraft by using plural swing models that reproduce different swing motions of the landing surface, such that an optimum solution fitted to an evaluation condition is set as the coupling weight coefficient.

13. The landing-control method for the aircraft according to claim 12, wherein said learning said coupling weight coefficient comprises:
changing the plural swing models to different swing models every evolution of a predetermined generation cycle.

14. The landing-control method for the aircraft according to claim 12, wherein said learning said coupling weight coefficient comprises:
estimating the landing condition of the aircraft by further using an artificial swing model wherein a swing condition of the landing surface is intentionally operated by an operator to set the optimum solution fitted to the evaluation condition as the coupling weight coefficient.

* * * * *